United States Patent
Lee et al.

(10) Patent No.: US 11,187,286 B1
(45) Date of Patent: Nov. 30, 2021

(54) METHOD FOR CONTROLLING CLUTCH ACTUATOR FOR AUTOMATED MANUAL TRANSMISSION

(71) Applicants: HYUNDAI MOTOR COMPANY, Seoul (KR); KIA MOTORS CORPORATION, Seoul (KR)

(72) Inventors: Dong Joo Lee, Suwon-si (KR); Myoung Soo Park, Hwaseong-si (KR); Jeong Heon Kam, Seongnam-si (KR); Han Ki Hong, Seongnam-si (KR); Hongsuk Suh, Hanam-si (KR); Hosung Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/075,998

(22) Filed: Oct. 21, 2020

(30) Foreign Application Priority Data

Jun. 25, 2020 (KR) ......................... 10-2020-0077852

(51) Int. Cl.
*F16D 48/02* (2006.01)
*F16D 48/06* (2006.01)
*F16D 121/04* (2012.01)
*F16D 125/28* (2012.01)

(52) U.S. Cl.
CPC .......... *F16D 48/02* (2013.01); *F16D 48/066* (2013.01); *F16D 2048/0212* (2013.01); *F16D 2048/0218* (2013.01); *F16D 2121/04* (2013.01); *F16D 2125/28* (2013.01); *F16D 2500/1024* (2013.01); *F16D 2500/1026* (2013.01); *F16D 2500/1083* (2013.01); *F16D 2500/3026* (2013.01); *F16D 2500/31413* (2013.01); *F16D 2500/31466* (2013.01); *F16D 2500/7061* (2013.01); *F16D 2500/70406* (2013.01)

(58) Field of Classification Search
None
See application file for complete search history.

(56) References Cited

U.S. PATENT DOCUMENTS

| 6,042,503 | A | * | 3/2000 | Kosik | F16D 48/066 |
|---|---|---|---|---|---|
| | | | | | 477/78 |
| 2004/0157704 | A1 | * | 8/2004 | Stork | B60W 10/10 |
| | | | | | 477/166 |
| 2012/0186934 | A1 | * | 7/2012 | Ota | F16D 25/083 |
| | | | | | 192/85.63 |

* cited by examiner

*Primary Examiner* — Timothy Hannon
(74) *Attorney, Agent, or Firm* — Lempia Summerfield Katz LLC

(57) ABSTRACT

In a method for controlling a clutch actuator for an automated manual transmission, when a driver's operation signal is input for operation of the clutch actuator, the hydraulic pressure of a hydraulic chamber of the clutch actuator forms pressure equilibrium with the atmospheric pressure through a pressure equilibrium control by standing by at a control-standby state before an actual stroke position of the clutch actuator enters a hydraulic pressure generation range from a hydraulic pressure release range. When the actual stroke position of the clutch actuator enters the hydraulic pressure generation range from the hydraulic pressure release range, the clutch actuator is moved to the predetermined stroke position by a predetermined operation speed, and then controlled to follow the driver's operation signal.

12 Claims, 4 Drawing Sheets

METHOD FOR CONTROLLING CLUTCH ACTUATOR FOR AUTOMATED MANUAL TRANSMISSION

CROSS-REFERENCE TO RELATED APPLICATION

This application claims priority to and the benefit of Korean Patent Application No. 10-2020-0077852, filed on Jun. 25, 2020, the entire contents of which are incorporated herein by reference.

FIELD

The present disclosure relates to a method for controlling a clutch actuator for an automated manual transmission.

BACKGROUND

The statements in this section merely provide background information related to the present disclosure and may not constitute prior art.

Recently, in the field of vehicle industry, application of an automated manual transmission based on a manual transmission (MT) structure has been expanded to respond to exhaust gas regulation and fuel efficiency regulation.

In general, a manual transmission directly receives an engine torque through a clutch, and thereby has a merit of excellent power delivery efficiency and a fast reaction speed due to direct connection of power. However, there is a drawback of causing a heterogeneous shift feel since the power source needs to be blocked in order to shift the gear.

On the other hand, an automated manual transmission (AMT) maximizes high power delivery efficiency and power performance, which are the merits of this manual transmission, and improves driver convenience and minimizes shift disconnection by further employing an automation system for clutch operation.

Such automated manual transmissions (AMT) include a semi-automatic transmission (SAT), a double clutch transmission (DCT), and the like.

The semi-automatic transmission (SAT), which may be also called an intelligent manual transmission (iMT), provides a smooth shift feel upon a shift lever operation without a driver's clutch pedal operation, according to a scheme that an electronic control unit receives information, such as a current transmission position, i.e., a current shift-stage, an accelerator pedal position, an engine speed, and the like, from sensors and automatically calculates an optimal clutch operation period according to a vehicle driving state, and then the clutch actuator is operated at the optimal clutch operation period.

In addition, the double clutch transmission (DCT) includes two clutch devices and gear trains of a manual transmission, selectively receives the torque of an engine through two input shafts through the two clutch devices, and enables sequential shifting by gear trains on the input shafts, thereby improving power delivery efficiency and convenience.

Such an automated manual transmission may be provided with a Rev-matching function, where a smooth shift feel is achieved by raising the engine speed by an engine control unit (ECU) to optimally adjust the engine torque without an accelerator pedal operation, or by adjusting the engine speed appropriate to the gear ratio after shifting.

In order to automatically control the operation of a clutch, the automated manual transmission is provided with a clutch actuator that is controlled by, for example, a transmission control unit (TCU).

The clutch actuator may be classified into a hydraulic type and a mechanical type. Since the hydraulic clutch actuator is connected to a slave cylinder for a clutch operation through a hydraulic pressure tube, the hydraulic clutch actuator shows, when compared to a mechanical clutch actuator, higher degree of freedom in layout arrangement, and provides a merit of coping with a higher torque capacity by setting a cross-section ratio of a hydraulic line.

Meanwhile, when a hydraulic clutch actuator is structured that a hydraulic pressure is formed by a mechanical part connected to a motor, such a hydraulic clutch actuator is called an electro-hydraulic clutch actuator.

The above information disclosed in this Background section is only for enhancement of understanding of the background of the present disclosure, and therefore it may contain information that does not form the prior art that is already known to a person of ordinary skill in the art.

SUMMARY

An exemplary method is for controlling a clutch actuator for an automated manual transmission, where the clutch actuator is configured to form an operation hydraulic pressure of a clutch while a piston of the clutch actuator reciprocally operates in a hydraulic chamber of a cylinder body by a cam slide driven by a motor in a housing, and the cylinder body is formed with an orifice hole connecting the hydraulic chamber and a reservoir tank such that the hydraulic pressure of the hydraulic chamber may form pressure equilibrium with an atmospheric pressure. The method includes: collecting, by a controller, driving information desired for a shift control of the transmission from a driving information detection unit; determining, by the controller, whether an actual stroke position of the clutch actuator is in a moved-forward state by more than a predetermined stroke position, based on the driving information; outputting, by the controller, a first target stroke signal to follow a sensor stroke signal according to a driver's operation, through a feedback control, when the actual stroke position of the clutch actuator is in the moved-forward state by more than the predetermined stroke position; outputting, by the controller, a second target stroke signal for enabling the clutch actuator to stand by at a control-standby stroke position where a hydraulic pressure of the hydraulic chamber forms pressure equilibrium with the atmospheric pressure when the actual stroke position of the clutch actuator in a moved-forward state by less than the predetermined stroke position; and performing, by the controller, a pressure equilibrium control, where the controller counts an actual control-standby period while the clutch actuator standing by at the control-standby stroke position, and moves the clutch actuator to the predetermined stroke position by a predetermined operation speed only when a target control-standby period is satisfied, and a stroke position calculated from the sensor stroke signal is in a moved-forward position by more than the predetermined stroke position.

The driving information may include at least one of a hall sensor signal of the motor, a signal of a clutch pedal position sensor, a signal of a clutch pedal angle sensor, a signal of a TGS lever position sensor, a signal of a TGS lever angle sensor, a signal of a complete control shaft position sensor, or a signal of a complete control shaft angle sensor.

The predetermined stroke position may be a position on an operation stroke of the clutch actuator where a front seal of the piston closes the orifice hole to form the hydraulic pressure in the hydraulic chamber.

The sensor stroke signal may be an output signal of a position sensor arranged at a clutch pedal, a transmission gear shift (TGS) lever, or a complete control shaft that is operated according to a driver's operation.

The sensor stroke signal may be an output signal of an angle sensor arranged at a clutch pedal, a transmission gear shift (TGS) lever, or a complete control shaft that is operated according to a driver's operation.

The first and second target stroke signals to follow the sensor stroke signal may be a control signal of the controller outputted to the motor of the clutch actuator such that the clutch actuator is moved to a corresponding stroke position according to the sensor stroke signal.

The actual stroke position may be an actually moved stroke position of the piston of the clutch actuator and detected by an operation position sensor of the clutch actuator.

The control-standby stroke position may be a position on the operation stroke of the clutch actuator where a front seal of the piston opens the orifice hole to release the hydraulic pressure from the hydraulic chamber.

The performing of the pressure equilibrium control may include determining whether the actual stroke position of the clutch actuator is the same as the control-standby stroke position, counting the actual control-standby period when the actual stroke position is the same as the control-standby stroke position, determining whether the actual control-standby period satisfies the target control-standby period, determining whether the stroke position calculated from the sensor stroke signal is the moved-forward position by more than the predetermined stroke position when the actual control-standby period satisfies the target control-standby period, and outputting the target stroke signal to move the clutch actuator to the predetermined stroke position by a predetermined operation speed when the stroke position calculated from the sensor stroke signal is in the moved-forward position by more than the predetermined stroke position.

The actual control-standby period may be counted from a time point at which the actual stroke position of the clutch actuator reaches the control-standby stroke position.

The target control-standby period may be set to be a minimum time desired for the hydraulic pressure of the hydraulic chamber within the cylinder body to form pressure equilibrium with an atmospheric pressure while the clutch actuator is in the control-standby stroke position.

The predetermined operation speed may be a speed calculated when the motor operates with a full power.

According to an exemplary form, when the driver's operation signal is input for operation of the clutch actuator, the hydraulic pressure of the hydraulic chamber forms pressure equilibrium with the atmospheric pressure through a pressure equilibrium control by standing by at a control-standby state before the actual stroke position of the clutch actuator enters the hydraulic pressure generation range from the hydraulic pressure release range. Therefore, the operation stroke of the clutch actuator may be uniformly maintained.

In addition, when the actual stroke position of the clutch actuator enters the hydraulic pressure generation range from the hydraulic pressure release range, the clutch actuator is moved to the predetermined stroke position by the predetermined operation speed, and then controlled to follow the driver's operation signal. Therefore, operation consistency may be secured with uniform operation stroke.

Other effects that may be obtained or are predicted by an exemplary form will be explicitly or implicitly described in a detailed description of the present disclosure. That is, various effects that are predicted according to an exemplary form will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
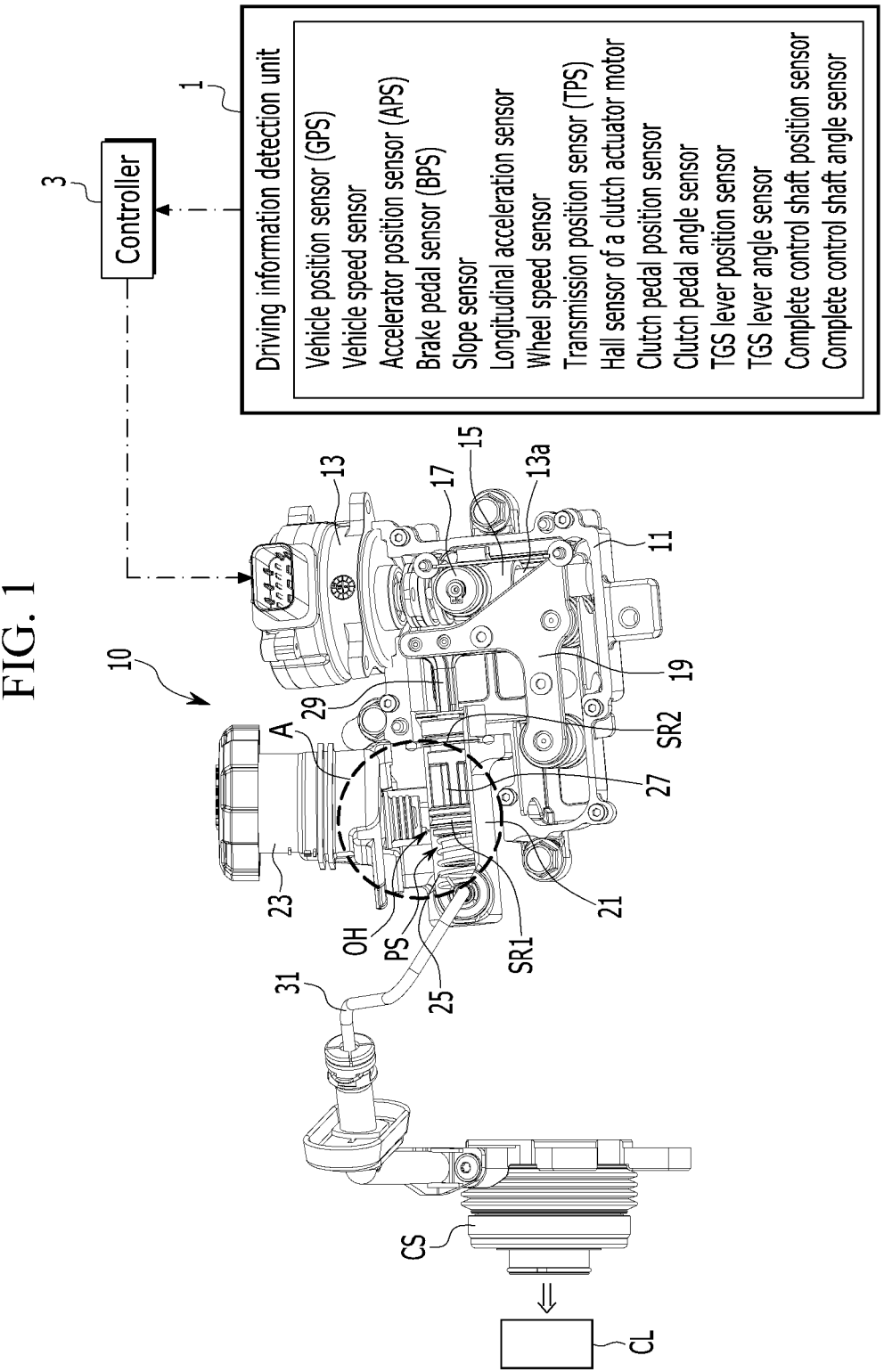
FIG. 1 is a schematic diagram of an exemplary electro-hydraulic clutch actuator for controlling an operation of a clutch applied to an automated manual transmission.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

In order to clarify the present disclosure, parts that are not related to the description will be omitted, and the same elements or equivalents are referred to with the same reference numerals throughout the specification.

In addition, unless explicitly described to the contrary, the word "comprise" and variations such as "comprises" or "comprising", will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

Throughout the specification, terms such as first, second, "A", "B", "a)", "b)", and the like will be used only to describe various elements, and are not to be interpreted as limiting these elements. These terms are only for distinguishing the constituent elements from other constituent elements, and nature or order of the constituent elements is not limited by the term.

Firstly, a clutch actuator applicable with a method for controlling a clutch actuator for an automated manual transmission according to an exemplary form of the present disclosure is described in detail with reference to the drawings.

Figure 2:
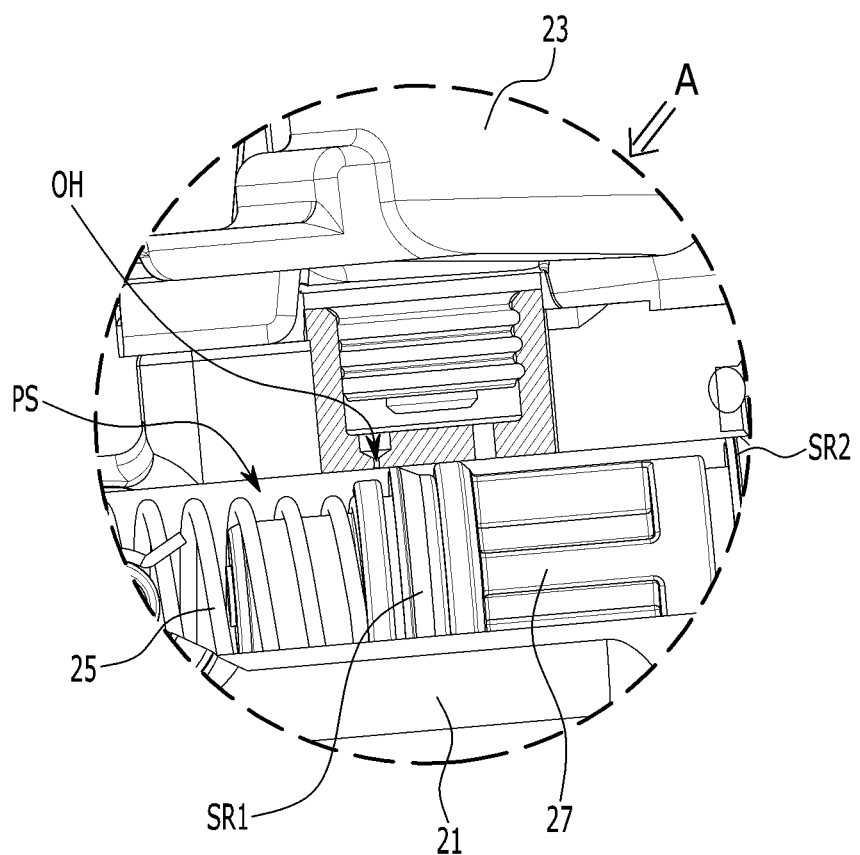
FIG. 2 is an enlarged view of part A of FIG. 1.

FIG. 1 is a schematic diagram of an exemplary electro-hydraulic clutch actuator for controlling an operation of a clutch applied to an automated manual transmission, and FIG. 2 is an enlarged view of part A of FIG. 1.

Referring to FIG. 1, an electro-hydraulic clutch actuator 10 (hereinafter called a clutch actuator) 10 applicable with a method for controlling a clutch actuator for an automated manual transmission according to an exemplary form includes a housing 11, a motor 13, a ball screw 15, a cam slide 19, a cylinder body 21, and a reservoir tank 23.

Referring to FIG. 1, in the electro-hydraulic clutch actuator 10, the motor 13 is installed on an upper side of the housing 11, and the ball screw 15 is installed on a rotation shaft 13a of the motor 13, movably along an axial direction.

The cam slide 19 is provided in the housing 11 to move along a direction perpendicular to the axial direction by a cam roller 17 installed at the ball screw 15.

The cylinder body 21 is fixed on a front side of the housing 11, and the reservoir tank 23 is installed on an upper side of the cylinder body 21.

A piston 27 having a front end elastically supported by a spring 25 is provided in the cylinder body 21, and a rear end of the piston 27 contacts a pushrod 29 fixed to an upper side of the cam slide 19, thereby receiving a force of the cam slide 19.

The piston 27 is provided with front and rear seals SR1 and SR2 at a front side and a rear side on an exterior circumference, and reciprocally moves in a hydraulic chamber PS of the cylinder body 21. The hydraulic chamber PS of the cylinder body 21 is connected to a slave cylinder CS through a hydraulic pressure tube 31 to supply an operation hydraulic pressure for an operation of a clutch CL.

In such an electro-hydraulic clutch actuator 10, in order to form a pressure equilibrium by removing a pressure difference between an atmospheric pressure and a pressure within the hydraulic chamber PS while a hydraulic pressure is not applied to the slave cylinder CS, an orifice hole OH connected to the reservoir tank 23 is formed on the cylinder body 21.

That is, when the piston 27 moves forward by an operation of the motor 13, the front seal SR1 on the piston 27 closes the orifice hole OH to close the hydraulic chamber PS to form a hydraulic pressure in the hydraulic chamber PS, thereby supplying the hydraulic pressure to the slave cylinder CS for operating the clutch CL.

However, depending on a speed at which the front seal SR1 passes the orifice hole OH while the piston 27 moves forward, there is a difference in a flow rate that flows into the reservoir tank 23 through the orifice hole OH. This difference in flow rate inside the hydraulic chamber PS also causes a difference in the operation stroke of the clutch CL.

Meanwhile, when the clutch CL is released, the piston 27 moves backward under the control of the motor 13, and the front seal SR1 opens the orifice hole OH such that the hydraulic pressure inside the hydraulic chamber PS is exhausted to the reservoir tank 23 through the orifice hole OH, thereby forming the pressure equilibrium with the atmospheric pressure.

Here, a time delay occurs until the hydraulic pressure inside the hydraulic chamber PS is completely resolved through the orifice hole OH. At this time, the front seal SR1 may close the orifice hole OH again for the clutch operation before the hydraulic pressure inside the hydraulic chamber PS forms the pressure equilibrium with the atmospheric pressure. In this case, the hydraulic pressure inside the hydraulic chamber PS may differ from an intended value, thereby possibly affecting the operation stroke of the clutch CL.

Referring to FIG. 2, in such an arrangement of the electro-hydraulic clutch actuator 10, according to an exemplary form, the hydraulic chamber PS is formed inside the cylinder body 21, and the piston 27 is movably installed in the hydraulic chamber PS.

The front end of the piston 27 is supported by the spring 25 provided inside the hydraulic chamber PS, and the rear end of the piston 27 contacts the pushrod 29 fixed to the upper side of the cam slide 19.

In addition, the front and rear seals SR1 and SR2 are respectively installed at frond side and rear side on the exterior circumference of the piston 27, and the piston 27 may reciprocally operate in the hydraulic chamber PS of the cylinder body 21. The hydraulic chamber PS is connected to the slave cylinder CS through the hydraulic pressure tube 31 to supply the operation hydraulic pressure for the operation of the clutch CL.

In addition, the motor 13 is electrically connected to a controller 3, and the controller 3 is electrically connected to a driving information detection unit 1 to output a control signal for controlling the motor 13 in accordance with a driver's operation intension.

Here, the controller 3 may be implemented as a transmission control unit (TCU) that controls an automated manual transmission according to an exemplary form of the present disclosure.

That is, for a shifting according to a driving condition of a vehicle, the controller 3 applies a control signal to the motor 13 of the clutch actuator 10 to control the operation of the clutch CL.

At this time, the output signal of the controller 3 for controlling the motor 13 may include current control information, duty control information, and PID control information.

In addition, according to driving of the vehicle, the driving information detector 1 detects driving information desired for controlling a shifting mode of an electronic shifting system for the vehicle from various sensors employed in the vehicle and the controller 3, and transmits the detected information to the controller 3.

For example, the driving information detection unit 1 may include a vehicle position sensor (GPS), a vehicle speed sensor, an accelerator position sensor (APS), a brake pedal sensor (BPS), a slope sensor, a longitudinal acceleration sensor, a wheel speed sensor, a transmission position sensor (TPS), a hall sensor of a clutch actuator motor, a clutch pedal position sensor, a clutch pedal angle sensor, a TGS lever position sensor, a TGS lever angle sensor, a complete control shaft position sensor, a complete control shaft angle sensor, and the like.

The driving information detector 1 according to an exemplary form may detect driving information measured from at least one of a hall sensor of the motor 13 for the clutch actuator 10, a clutch pedal position sensor, a clutch pedal angle sensor, a TGS lever position sensor, a TGS lever angle sensor, a complete control shaft position sensor, and a complete control shaft angle sensor.

In addition, the orifice hole OH connected to the reservoir tank 23 is formed on the cylinder body 21 to form pressure equilibrium by removing the pressure difference between the atmospheric pressure and the hydraulic pressure inside the hydraulic chamber PS.

That is, when the piston 27 moves forward within the hydraulic chamber PS by controlling the motor 13 of the clutch actuator 10 for the clutch operation, the front seal SR1 on the piston 27 closes an orifice hole OH to close the hydraulic chamber PS, and forms a hydraulic pressure in the hydraulic chamber PS to operate the clutch CL.

Figure 3:
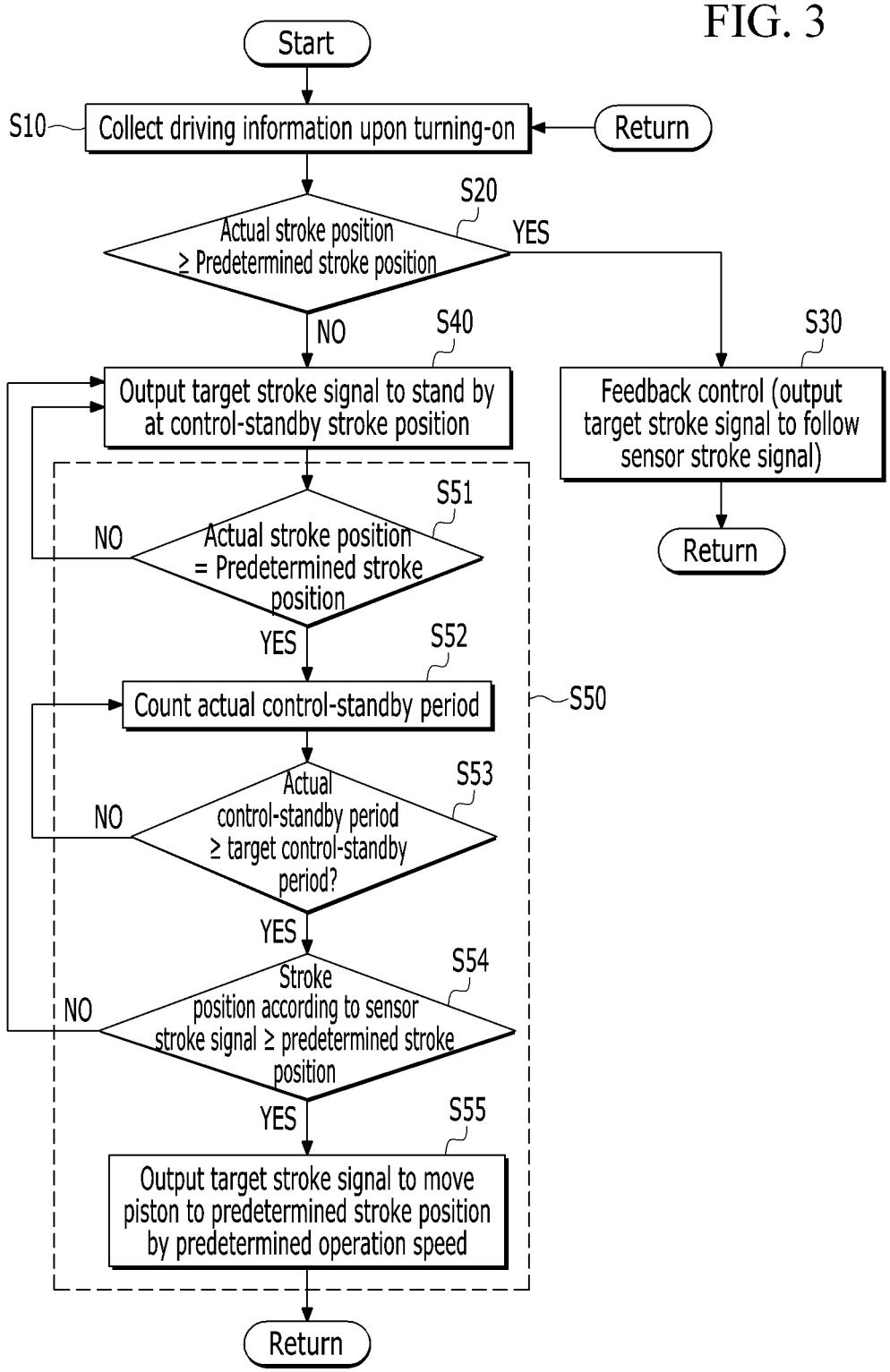
FIG. 3 is a flowchart showing a method for controlling an electro-hydraulic clutch actuator according to an exemplary form of the present disclosure.
Figure 4:
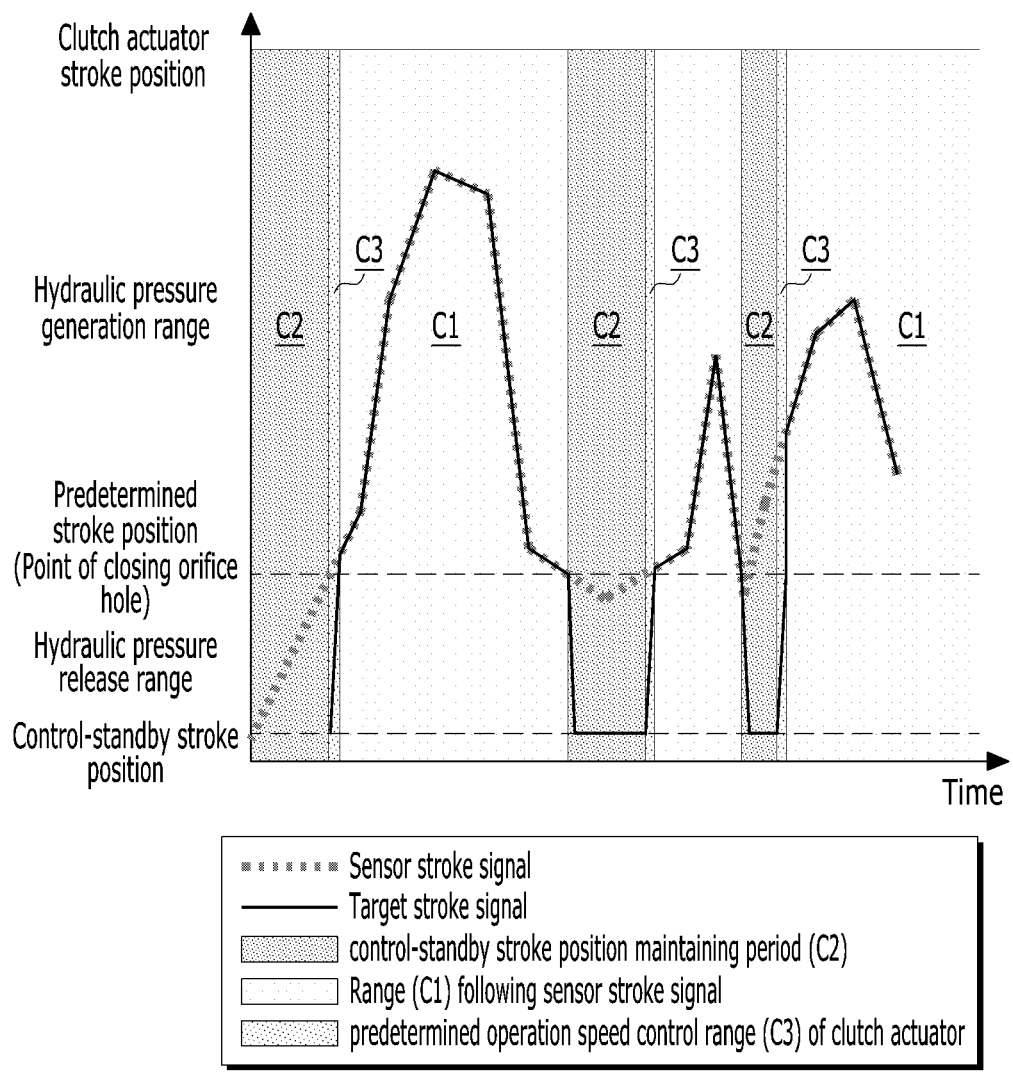
FIG. 4 is a graph for illustrating a control logic according to a method for controlling an electro-hydraulic clutch actuator according to an exemplary form of the present disclosure.

FIG. 3 is a flowchart showing a method for controlling a clutch actuator for an automated manual transmission according to an exemplary form, and FIG. 4 is a graph for illustrating control logic according to a method for controlling a clutch actuator for an automated manual transmission according to an exemplary form of the present disclosure.

Hereinafter, the method for controlling a clutch actuator for an automated manual transmission is described in detail with reference to FIG. 3 and FIG. 4.

Firstly, terms used in description for a method for controlling a clutch actuator for an automated manual transmission according to an exemplary form are described.

In the following description of a method for controlling a clutch actuator for an automated manual transmission according to an exemplary form, terms such as a sensor stroke signal, a target stroke signal, an actual stroke signal, a predetermined stroke position, a control-standby stroke position, an actual control-standby period, a target control-standby period, etc. are used.

The sensor stroke signal may be defined as an output signal of a position sensor or an angle sensor configured in a clutch pedal, a transmission gear shift (TGS) lever, or the complete control shaft operated according to the driver's operation. That is, the sensor stroke signal is an output signal outputted from a relevant sensor proportionally to a position change or an angle change when the clutch pedal, the TGS lever, or the complete control shaft is operated according to driver's operation intention, and, in an exemplary form of the present disclosure, may refer to an output signal output from the driving information detection unit 1.

The target stroke signal may be defined as a control signal of the controller 3, according to the sensor stroke signal, outputted to the motor 13 of the clutch actuator 10 to control the clutch actuator 10 to a corresponding stroke position. That is, the target stroke signal refers to an output signal that the controller 3 outputs to control a drive current/voltage applied to the motor 13 through PID control, duty control, current application amount control, and the like.

The actual stroke signal may be defined as a position signal corresponding to an actual stroke position of the clutch actuator 10, which may be outputted from an operation position sensor of the clutch actuator 10. That is, the operation position sensor may be implemented as a hall sensor of the motor 13, and may be a sensor separately provided on the cam slide 19 or the piston 27. The position signal corresponding to an actually moved stroke position of the piston 27 is always input from such a sensor to the controller 3.

The predetermined stroke position may be defined as a position on the operation stroke of the clutch actuator 10, where the front seal SR1 on the piston 27 closes the orifice hole OH to form a hydraulic pressure in the hydraulic chamber PS. That is, the predetermined stroke position becomes a reference point for partitioning a hydraulic pressure generation range and a hydraulic pressure release range on the vertical axis of the graph shown in FIG. 4. The hydraulic pressure generation range is a range where the hydraulic pressure is formed in the hydraulic chamber PS according to forward movement of the piston 27, while the hydraulic chamber PS is closed after the front seal SR1 on the piston 27 passes the orifice hole OH. On the other hand, the hydraulic pressure release range is a range where the hydraulic pressure of the hydraulic chamber PS is released to the atmospheric pressure, since the front seal SR1 on the piston 27 opens the orifice hole OH such that the hydraulic chamber PS is connected to the reservoir tank 23 of the atmospheric pressure through the orifice hole OH.

The control-standby stroke position may be defined as a standby position of the clutch actuator 10 on the operation stroke while the front seal SR1 on the piston 27 maintains opening of the orifice hole OH such that the hydraulic pressure of the hydraulic chamber PS is released to the atmospheric pressure. That is, a range between the control-standby stroke position and the predetermined stroke position may be the hydraulic pressure release range.

In addition, the actual control-standby period may be defined as a time (period) counted by the controller 3 starting from a time point at which the stroke position of the clutch actuator 10 according to the actual stroke signal reaches the control-standby stroke position.

The target control-standby period may be defined as a minimum time desired for the hydraulic pressure of the hydraulic chamber PS within the cylinder body 21 to form pressure equilibrium with the atmospheric pressure while the clutch actuator 10 is in the control-standby stroke position, and may be set as a predetermined period in the controller 3.

In the above description of terms, the expression that the clutch actuator 10 is positioned at a specific stroke position may mean the piston 27 that operates in the hydraulic chamber PS is positioned at that specific position on the operation stroke.

Hereinafter, a method for controlling a clutch actuator for an automated manual transmission according to exemplary form is described in detail with reference to FIG. 3 and FIG. 4.

Firstly as step S10, when the vehicle is turned on, the controller 3 collects the driving information detected by the driving information detection unit 1.

Then at step S20, the controller 3 analyzes the collected driving information and determines whether the actual stroke position of the clutch actuator 10 is in a moved-forward state by more than the predetermined stroke position, as a premise for a shift control according to the driving information of the vehicle.

That is, the controller determines whether the piston 27 has moved forward such that the front seal SR1 closes the orifice hole OH such that the hydraulic chamber PS is closed and separated from the reservoir tank 23.

When the actual stroke position of the clutch actuator 10 is in the moved-forward state by more than the predetermined stroke position (S20—YES), the controller 3 outputs, at step S30, the target stroke signal to follow the sensor stroke signal according to the driver's operation, through a feedback control. At this time, the controller 3 determines that the actual stroke position of the clutch actuator 10 is in the range C1 in FIG. 4, and outputs the target stroke signal to control the motor 13.

Meanwhile, when the actual stroke position of the clutch actuator 10 is in a moved-forward state by less than the predetermined stroke position (S20—NO), the controller 3 outputs, at step S40, the target stroke signal to enable the clutch actuator 10 to stand by at the control-standby stroke position where the hydraulic pressure of the hydraulic chamber PS and the atmospheric pressure form pressure equilibrium. At this time, the controller 3 determines that the actual stroke position of the clutch actuator 10 is in the range C2 in FIG. 4, and does not output the target stroke signal to control the motor 13 although the sensor stroke signal is input.

At step S50 subsequent to the step S40, the controller 3 performs a pressure equilibrium control. That is, at the step S50, the controller 3 counts the actual control-standby period while the clutch actuator 10 stays at the control-standby stroke position, and moves the clutch actuator 10 to the predetermined stroke position by a predetermined operation speed only when the target control-standby period is satisfied, and a stroke position calculated from the sensor stroke signal is in a moved-forward position by more than the predetermined stroke position.

In more detail, in the pressure equilibrium control S50, at step S51 subsequent to the step S40, the controller 3 determines whether the actual stroke position of the clutch actuator 10 is the same as the control-standby stroke position. At this time, whether the actual stroke position of the clutch actuator 10 is the same as the control-standby stroke position or not, it may be a state that the hydraulic chamber PS is connected to the reservoir tank 23 through the orifice hole OH such that the hydraulic pressure in the hydraulic chamber PS is proceeding to form pressure equilibrium with the atmospheric pressure.

At step S52, when the actual stroke position is the same as the control-standby stroke position (S51—Yes), the controller 3 may count the actual control-standby period.

Subsequently at step S53, the controller 3 may determine whether the counted actual control-standby period satisfies the target control-standby period, for example, whether the counted actual control-standby period is above the target control-standby period.

At this time, at the step S53, when the actual control-standby period does not satisfy the target control-standby period, the controller 3 returns to the step S52 to keep counting the actual control-standby period.

At step S54, when the actual control-standby period satisfies the target control-standby period (S53—Yes), the controller 3 determines whether the stroke position calculated from the sensor stroke signal according to the driver's operation is in the moved-forward position by more than the predetermined stroke position.

Here, the condition that the actual control-standby period satisfies the target control-standby period may mean that the hydraulic chamber PS is connected to the reservoir tank 23 through the orifice hole OH by the piston 27 having moved backward in the hydraulic chamber PS, and pressure equilibrium has been formed between the hydraulic pressure in the hydraulic chamber PS and the atmospheric pressure.

At step S55, when the stroke position calculated from the sensor stroke signal is in the moved-forward position by more than the predetermined stroke position (S54—Yes), the controller 3 outputs the target stroke signal to move the clutch actuator 10 to the predetermined stroke position by the predetermined operation speed.

At the step S55, the predetermined operation speed is set to be a speed according to obtained by a full power driving of the motor 13, and may be in a range C3 in FIG. 4.

Meanwhile, when the actual stroke position is not the same as the control-standby stroke position at the step S51, the controller 3 returns to the step S40, to output the target stroke signal to the motor 13 until the actual stroke position of the clutch actuator 10 becomes the same as the control-standby stroke position.

In addition, when the stroke position calculated from the sensor stroke signal is not in the moved-forward position by more than the predetermined stroke position at the step S54, the controller 3 returns to the step S40 to output the target stroke signal to enable the clutch actuator 10 to stand by at the control-standby stroke position where the hydraulic pressure of the hydraulic chamber PS form pressure equilibrium with the atmospheric pressure.

In summary, according to a method for controlling a clutch actuator for an automated manual transmission according to an exemplary form, for a clutch actuator operation, the actual stroke position of the clutch actuator 10 according to the actual stroke signal detected by the driving information detection unit 1 is compared with the predetermined stroke position, and in the hydraulic pressure generation range where the actual stroke position of the clutch actuator 10 is above the predetermined stroke position, the motor 13 is controlled by the target stroke signal to follow the sensor stroke signal.

In addition, in the hydraulic pressure release range where the actual stroke position of the clutch actuator 10 is below the predetermined stroke position, the target stroke signal to enable clutch actuator 10 to stand by at the control-standby stroke position is outputted to control the motor 13 such that the hydraulic pressure of the hydraulic chamber PS may form sufficient pressure equilibrium with the atmospheric pressure.

In addition, when the actual stroke position of the clutch actuator 10 enters again the hydraulic pressure generation range after entering the hydraulic pressure release range where the actual stroke position is below the predetermined stroke position, the clutch actuator 10 is controlled to rapidly move to the predetermined stroke position by the predetermined operation speed after standing by at the control-standby stroke position for the target control-standby period, and then the motor 13 is controlled by the target stroke signal to follow the sensor stroke signal.

According to a method for controlling a clutch actuator for an automated manual transmission according to an exemplary form, when the driver's operation signal is input for operation of the clutch actuator 10, the hydraulic pressure of the hydraulic chamber PS forms pressure equilibrium with the atmospheric pressure through a pressure equilibrium control by standing by at a control-standby state before the actual stroke position of the clutch actuator 10 enters the hydraulic pressure generation range from the hydraulic pressure release range. Therefore, the operation stroke of the clutch actuator 10 may be uniformly maintained.

In addition, when the actual stroke position of the clutch actuator 10 enters the hydraulic pressure generation range from the hydraulic pressure release range, the clutch actuator 10 is moved to the predetermined stroke position by the predetermined operation speed, and then controlled to follow the driver's operation signal. Therefore, operation consistency may be secured with uniform operation stroke.

In addition, in a system having a so called start-stop coasting (SSC) function, the engine is frequently started and stopped while the vehicle is coasting. In such a system, a prompt operation of the clutch actuator according to an exemplary form is beneficial to enhance responsiveness of the operation of the SSC in response to the SSC operation and/or release condition.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

1: the driving information detection unit
3: controller
10: clutch actuator
11: housing
13: motor
15: ball screw
17: cam roller
19: cam slide
21: cylinder body
23: reservoir tank
25: spring
27: piston
29: pushrod
31: hydraulic pressure tube
CL: clutch
CS: slave cylinder
PS: hydraulic chamber
OH: orifice hole
SR1, SR2: seal

What is claimed is:

1. A method for controlling a clutch actuator for an automated manual transmission, where the clutch actuator is configured to form an operation hydraulic pressure of a clutch while a piston of the clutch actuator reciprocally operates in a hydraulic chamber of a cylinder body by a cam slide driven by a motor in a housing, and the cylinder body is formed with an orifice hole connecting the hydraulic chamber and a reservoir tank, the method comprising:
collecting, by a controller, driving information for a shift control of the automated manual transmission from a driving information detection unit;
determining, by the controller, whether an actual stroke position of the clutch actuator is in a moved-forward state by more than a predetermined stroke position, based on the driving information;
when the actual stroke position of the clutch actuator is in the moved-forward state by more than the predetermined stroke position, outputting, by the controller, a first target stroke signal to follow a sensor stroke signal based on an operation of a driver, through a feedback control;
when the actual stroke position of the clutch actuator is in a moved-forward state by less than the predetermined stroke position, outputting, by the controller, a second target stroke signal for enabling the clutch actuator to stand by at a control-standby stroke position where a hydraulic pressure of the hydraulic chamber forms pressure equilibrium with an atmospheric pressure; and
performing, by the controller, a pressure equilibrium control, where the controller counts an actual control-standby period while the clutch actuator standing by at the control-standby stroke position, and moves the clutch actuator to the predetermined stroke position by a predetermined operation speed only when a target control-standby period is satisfied, and a stroke position calculated from the sensor stroke signal is in a moved-forward position by more than the predetermined stroke position.

2. The method of claim 1, wherein the driving information comprises at least one of a hall sensor signal of the motor, a signal of a clutch pedal position sensor, a signal of a clutch pedal angle sensor, a signal of a transmission gear shift (TGS) lever position sensor, a signal of a TGS lever angle sensor, a signal of a complete control shaft position sensor, or a signal of a complete control shaft angle sensor.

3. The method of claim 1, wherein the predetermined stroke position is a position on an operation stroke of the clutch actuator where a front seal of the piston closes the orifice hole to form the hydraulic pressure in the hydraulic chamber.

4. The method of claim 1, wherein the sensor stroke signal is an output signal of a position sensor arranged at a clutch pedal, a transmission gear shift (TGS) lever, or a complete control shaft that is operated by the driver.

5. The method of claim 1, wherein the sensor stroke signal is an output signal of an angle sensor arranged at a clutch pedal, a transmission gear shift (TGS) lever, or a complete control shaft that is operated by the driver.

6. The method of claim 1, wherein the first and second target stroke signals to follow the sensor stroke signal are a control signal of the controller outputted to the motor of the clutch actuator such that the clutch actuator is moved to a corresponding stroke position based on the sensor stroke signal.

7. The method of claim 1, wherein the actual stroke position is an actually moved stroke position of the piston of the clutch actuator and detected by an operation position sensor of the clutch actuator.

8. The method of claim 1, wherein the control-standby stroke position is a position on an operation stroke of the clutch actuator where a front seal of the piston opens the orifice hole to release the hydraulic pressure from the hydraulic chamber.

9. The method of claim 1, wherein performing the pressure equilibrium control comprises:
determining whether the actual stroke position of the clutch actuator is the same as the control-standby stroke position;
counting the actual control-standby period when the actual stroke position is the same as the control-standby stroke position;
determining whether the actual control-standby period satisfies the target control-standby period;
when the actual control-standby period satisfies the target control-standby period, determining whether the stroke position calculated from the sensor stroke signal is the moved-forward position by more than the predetermined stroke position; and
when the stroke position calculated from the sensor stroke signal is in the moved-forward position by more than the predetermined stroke position, outputting the first target stroke signal to move the clutch actuator to the predetermined stroke position by a predetermined operation speed.

10. The method of claim 9, wherein the actual control-standby period is counted from a time point at which the actual stroke position of the clutch actuator reaches the control-standby stroke position.

11. The method of claim 9, wherein the target control-standby period is set to be a minimum time required for the hydraulic pressure of the hydraulic chamber within the cylinder body to form pressure equilibrium with an atmospheric pressure while the clutch actuator is in the control-standby stroke position.

12. The method of claim 9, wherein the predetermined operation speed is a speed calculated when the motor operates with a full power.

* * * * *